United States Patent [19]
Koehler et al.

[11] Patent Number: 5,725,172
[45] Date of Patent: Mar. 10, 1998

[54] FISHING LINE WINDER FOR FLY AND SPIN REELS

[76] Inventors: Robert F. Koehler, 20332 Clark St., Woodland Hills, Calif. 91367-5506; David F. Hanggee, 7015 Wyngate St., Tujunga, Calif. 91042

[21] Appl. No.: 612,182

[22] Filed: Mar. 7, 1996

[51] Int. Cl.⁶ .......................... A01K 89/00; B65H 54/00
[52] U.S. Cl. ............................................ 242/395; 242/902
[58] Field of Search ........................ 242/395, 396.9, 242/398, 399, 399.1, 538, 539

[56] References Cited

U.S. PATENT DOCUMENTS

| | | | |
|---|---|---|---|
| 2,459,963 | 1/1949 | Roark | 242/902 |
| 3,011,735 | 12/1961 | Lachat | 242/902 |
| 3,647,155 | 3/1972 | Jorgenson | 242/902 |
| 3,704,840 | 12/1972 | Haddock | 242/902 |
| 3,951,354 | 4/1976 | Bagby . | |
| 3,973,741 | 8/1976 | Dean . | |
| 4,007,886 | 2/1977 | Kaminstein | 242/902 |
| 4,310,126 | 1/1982 | Norleen | 242/902 |
| 4,540,136 | 9/1985 | Rauch . | |
| 4,588,139 | 5/1986 | Lines . | |
| 4,717,086 | 1/1988 | Crow | 242/395 |
| 4,762,286 | 8/1988 | Crow . | |
| 4,795,107 | 1/1989 | Williams | 242/407 |
| 5,056,732 | 10/1991 | Nicholson, Jr. | 242/395 |
| 5,551,645 | 9/1996 | Torvund | 242/404 |

*Primary Examiner*—John P. Darling
*Attorney, Agent, or Firm*—John P. Costello

[57] ABSTRACT

A fishing reel winding and unwinding device by which the line supply spool (or storage spool) is supported on a universal positioning turn table relative to a fishing reel secured to a reel support. The spool shaft is supported on an upright crank shaft and spool holder on a turn table, and the spool shaft is equipped with a crankshaft component for rotating an empty line supply spool thereon as during winding or unwinding a fishing reel. The spool shaft turn table is attached to the turret plate by a screw permitting swivel at 90-degree intervals for diversified winding or unwinding of reels with either left or right hand and either spin, fly or conventional line/reel applications without twisting the line out, but instead, retaining the natural manufactured characteristics of the line in use and in line storage.

12 Claims, 12 Drawing Sheets

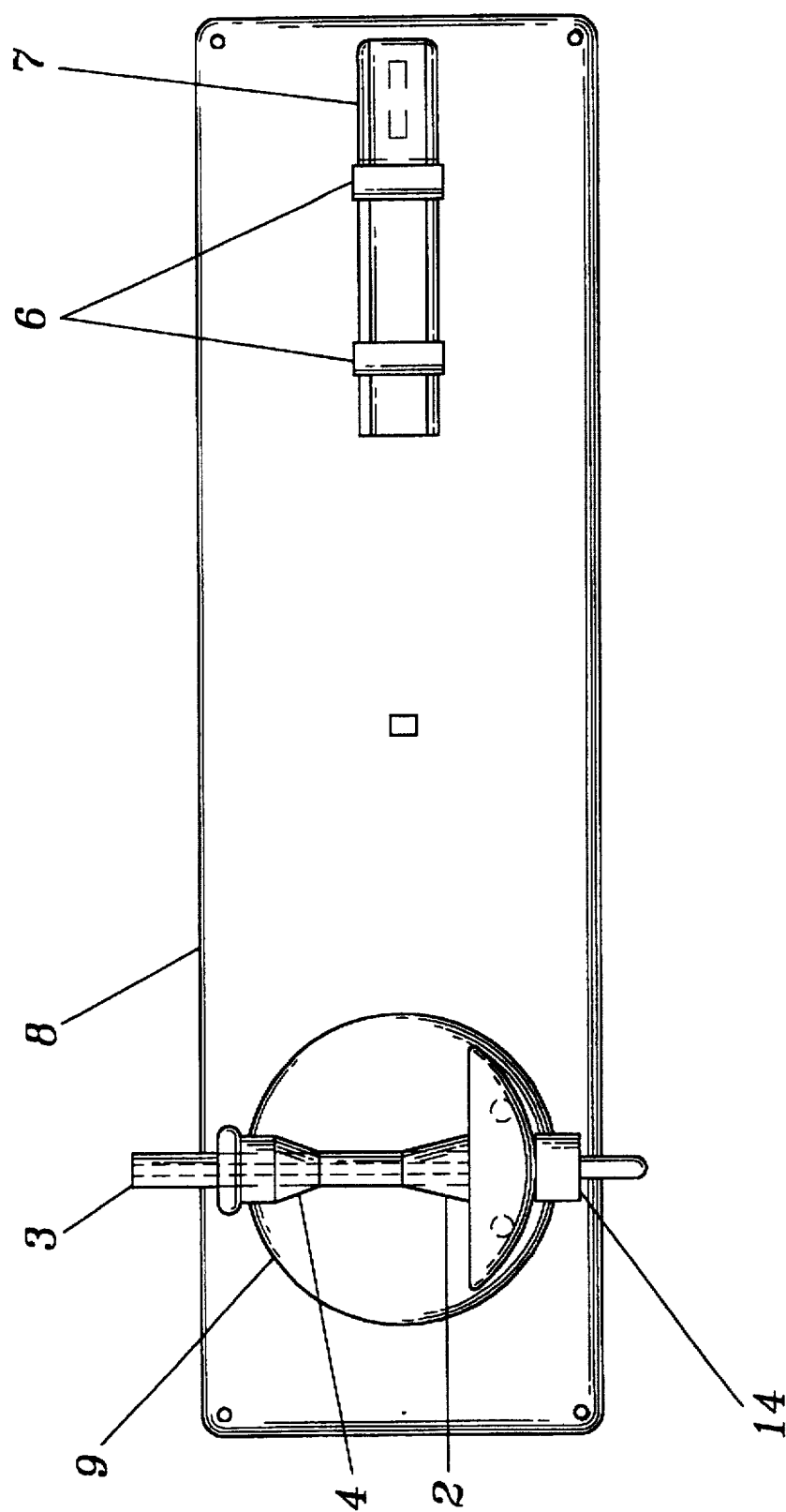
Figure 2-A

FISHING LINE WINDER FOR FLY AND SPIN REELS

BACKGROUND—FIELD OF INVENTION

This invention relates to fishing, specifically to an apparatus for winding and re-winding various fishing lines from and onto storage reels and onto either crank-type or crankless type reels, for usage by either left- or right-handed angler.

BACKGROUND—DESCRIPTION OF PRIOR ART

Sports anglers need to change the lines on their reels for various reasons: there are different kinds of lines for different kinds of fishing, there are different weights that lines come in, and there are various kinds of fishing, for instance, spin- or fly-fishing.

These various lines are purchased on storage spools, and then rewound onto the fishing reel, as needed. Also, the fishing line has to be removed from the reel when damaged or when replaced by another type of line due to a change in fishing conditions. This also simplifies cleaning fly line before storage.

Over the years, inventors have created several types of line winders and unwinders, looking for flexibility both in application to different fishing lines, and ease of use. U.S. Pat. No. 4,588,139 to Lines (1986) showed a motorized version of a reel-winder from a fishing line supply spool, permitting fast and easy reel winding. However, the motorized version excludes tension control of the line, and severely limits the types of lines it can handle when winding onto the reel. The kind of storage spools usable on the motorized winder is limited to a small range of width and diameter. Also, a motorized winder/unwinder is not practical for field use.

U.S. patent to Rauch (1985) is a hand-driven winder/unwinder. It can be used on-fishing-site, but lacks a stable base and simplicity of design, which makes it more liable to breakdown. When the fishing reel spool is detached from the reel entirely, there is no threading guide remaining to properly wind the line onto the spool, which can result in the line winding unevenly and improperly. Improperly wound line may impede line flow from the reel through the line guides on the fishing rod. For the angler, this reduces casting distance and in some instances, can result in tangled line at the reel.

There are many general-use winders patented, but their range of flexibility is limited to one or two particular types of lines, whether fishing or non-fishing. U.S. Pat. No. 4,762,286 to Crow (1988) rewinds specific-use nylon line for lawn edgers and trimmers, and lacks any further flexibility of use. Consumers are faced with a single-use product, instead of one able to handle one or more diversified uses.

U.S. Pat. No. 3,951,354 to Bagby (1976) and U.S. Pat. No. 3,973,741 to Dean (1976) are very similar. They are both winder and unwinder mechanisms, manually operated, and both attachable to the rod itself. Though each operates efficiently enough, the fact that the winder must be attached to the rod, not to a base, is impractical for the following reasons: the assembly of winder and rod are not stable when used; the clamp attachment common to these devices cracks and scratches the graphite and glass tubes which comprise most modern fishing rods. The winder must be detached from the rod each time, causing unnecessary consumption of time. Both winders had a very limited and inflexible use, especially since the variety of spools usable on the winders is severely limited by their necessarily lighter and smaller size. Such products were acceptable in 1976 when there were few of them on the market. Today's market requires a winder that is much more versatile and sophisticated.

None of the fore-existing and above-mentioned winders have the ability to be used instantly by right-handed or left-handed angler and for fly, spin and conventional fishing reel applications.. Some can be laboriously altered to use with either the right or left hand, but not easily.

OBJECTS AND ADVANTAGES

The following descriptions includes men and women.

Accordingly, several objects and advantages of the invention are:

(a) hand-driven, non-motorized apparatus, very simple and sturdy in design and very dependable for on-site usage;

(b) turn-table-mounted winder (or unwinder) provides an easy and rapid switch from right-to left-hand usage;

(c) in the center position the crank upright shaft is directly in line with the spinning reel, which reduces twisting of line, and makes this an ideal purpose winder, adaptable strictly for the fly-angler, the spinning angler, and the angler who uses conventional casting reels, or one who uses all three of them;

(d) storage spool has a split keyway (for spool shaft), allowing it to be locked to the shaft so that there is no slipping when the crank is turned;

(e) there is a utility slide cone that tightens with just the pressure being exerted against the spool, allowing for the proper tensions desired when winding line on or unwinding line from the spool;

(f) user can use as many storage spools as he wants to store different types of lines, especially the fly line. This includes, for example, the sinking tip line, the floating line, the sinking line, the level line, and the double-tapered line;

(g) different line weights can be used, anywhere from 1 through 12-weight lines, which can be both used and stored on the storage spools;

(h) reel spool, which run anywhere from $18.00–150.00 per spare spool each, can be replaced by storage spools retailing for $4.95 each;

(i) our unit uses the reel itself to rewind the line, hand-guiding the line properly onto the reel, as required for all fishing applications;

(j) the advantage of our storage spools is their rounder, bigger diameter versus the fishing reel diameter; thus, instead of being stored on a fishing reel with a small diameter creating a coiling memory effect, these expensive lines are stored on a much larger diameter spool, minimizing coiling memory;

(k) in using this unit for taking the line off and putting the line on the fishing reel, the line can be treated with a line-treating substance that protects the line, increases the line's life, and increases the casting distance with flyrods;

(l) enormous time and cost savings to the spinning angler: For purposes of convenience typical angler buys line in bulk. By being able to load the reel with sufficient line at home or out in the field, one is able to change the line more often, to one's advantage, because nylon line is very subject to deterioration with ultra violet, or to scraping and nicking;

(m) the fly line angler, having a stock of different types of weight lines, and considering the characteristics of the lines the angler carries while fishing, is able to use this very flexible unit in the field or at home; this is a big advantage over buying reel inserts for his expensive reels, or even average reels;

(n) our winder is light-weight and mounted on a sturdy turret plate; it can be carried by the angler on trips, and can be mounted anyplace;

(o) our unit is simply and sturdily constructed, making it less likely to break or malfunction;

by using a sturdy, stand-alone base, instead of using clamps which attach to the fragile tubes of a fishing rod, this invention prevents damage to expensive fishing tackle.

Further objects and advantages of our invention will become apparent from a consideration of the drawings and ensuing description.

DESCRIPTION OF DRAWING

In the drawings, each numeric code consistently refers to a particular part in any and all of the figures.

FIG. 2A shows a turret in position for fly reel and casting reel.

Figure 1:
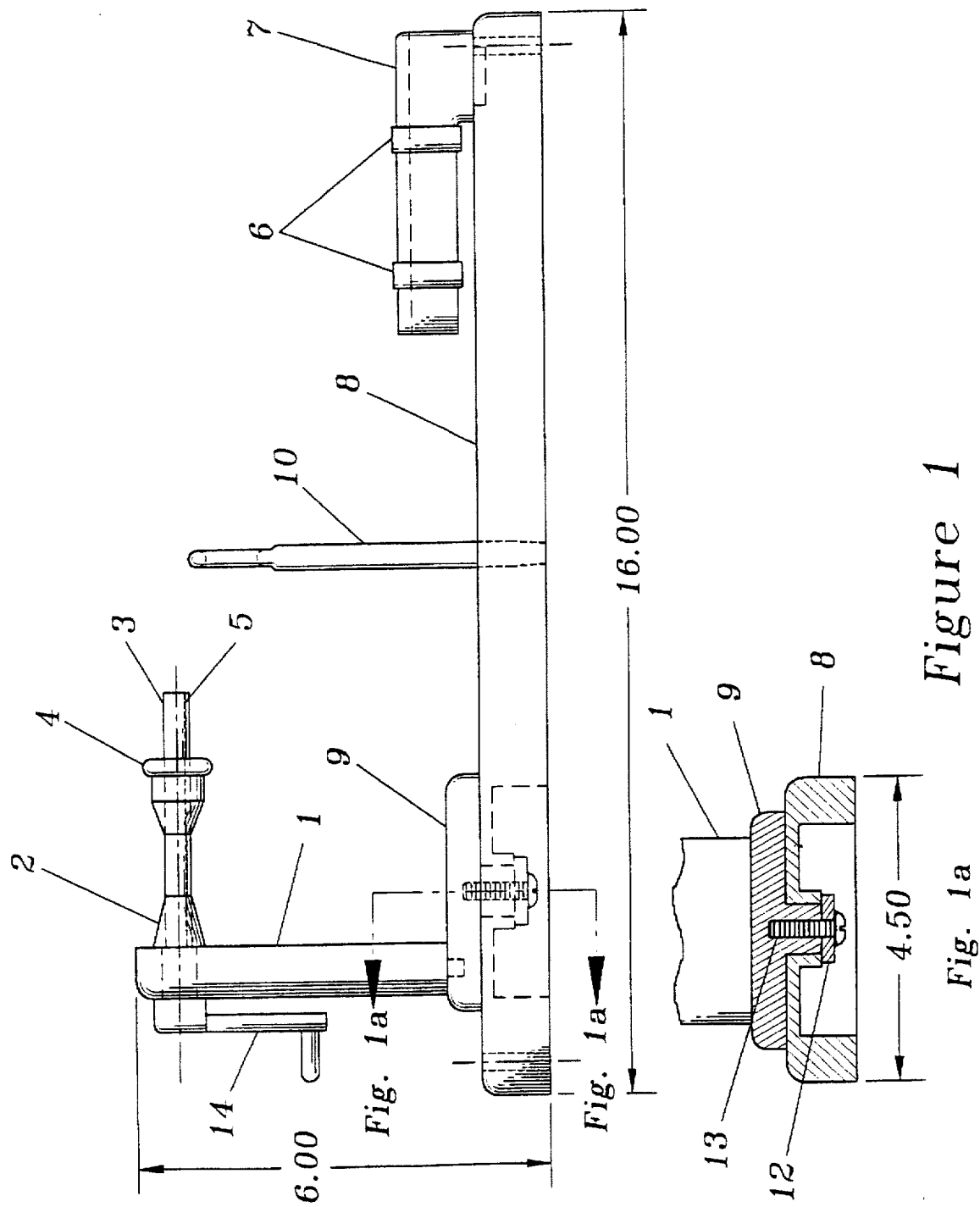
FIG. 1 shows an elevational side view, ½ scale drawing of the entire invention, and a fragmentary cross-section (Section A—A) of the turntable and turn table washer and screw, and a portion of the upright crank shaft and spool holder, still at ½ scale.
Figure 2:
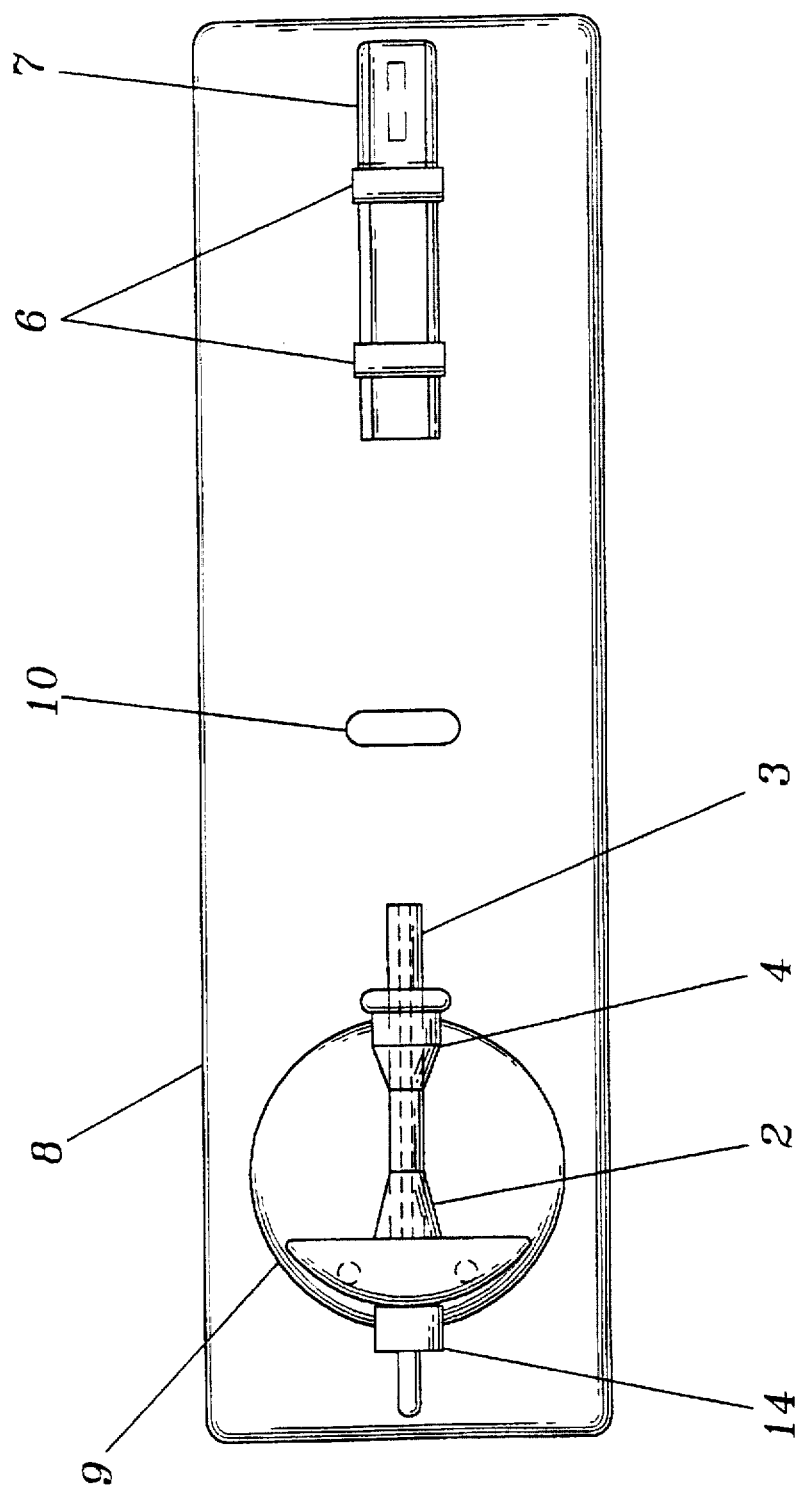
FIG. 2 shows a top plan view of the entire apparatus, at ½ scale, showing the reel support with two reel seat rings and the entire turntable with crank shaft and spool shaft, both secured to the turret plate. This is turret in position for spin reel loading.
Figure 3:
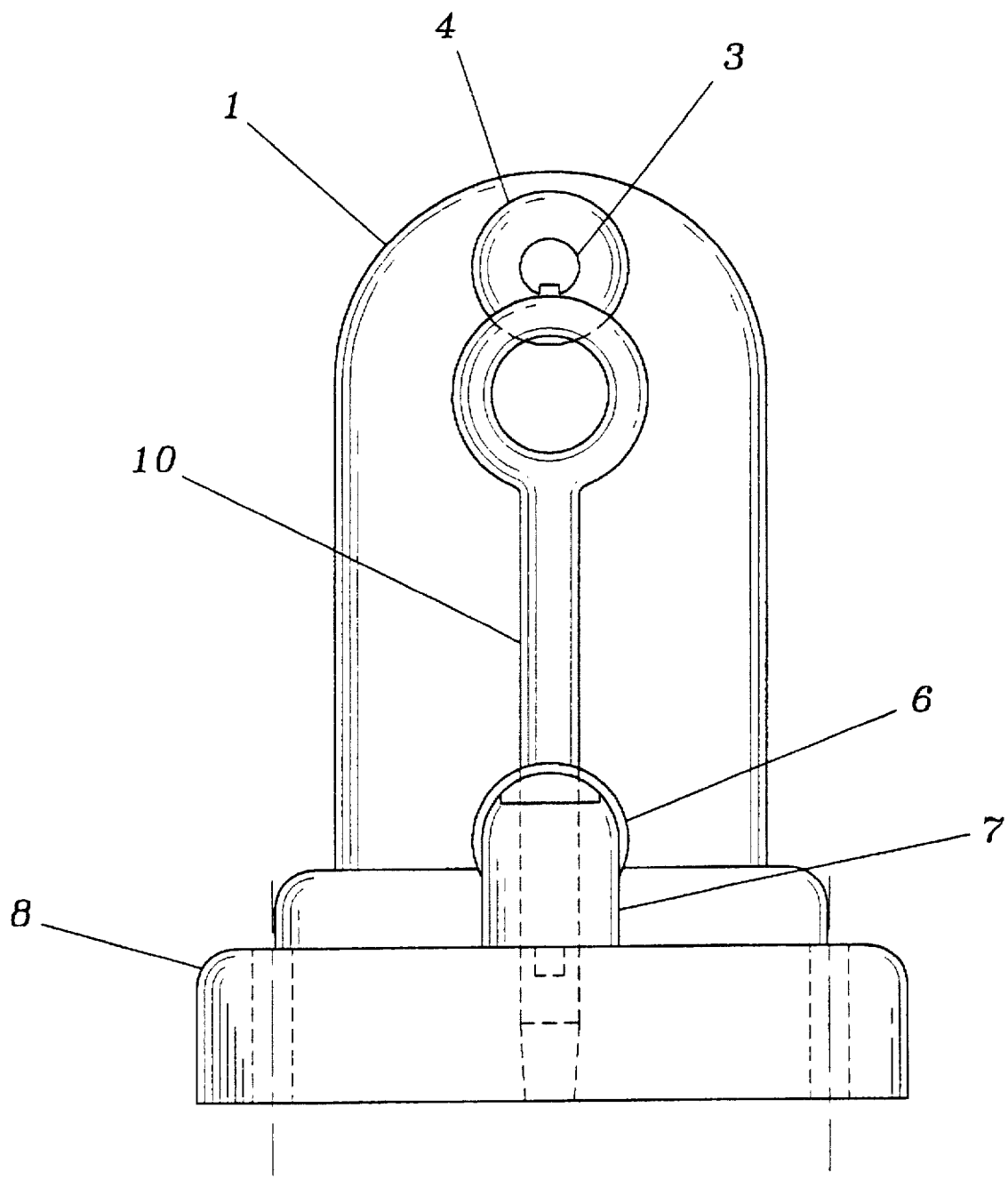
FIG. 3 shows end view of the entire invention, with the reel support and reel seat rings in the foreground, and the turntable and upright crank shaft and spool holder with spool shaft and friction cone reel retainer in the rear, both mounted on the turret plate, at 1/1 scale.
Figure 4:
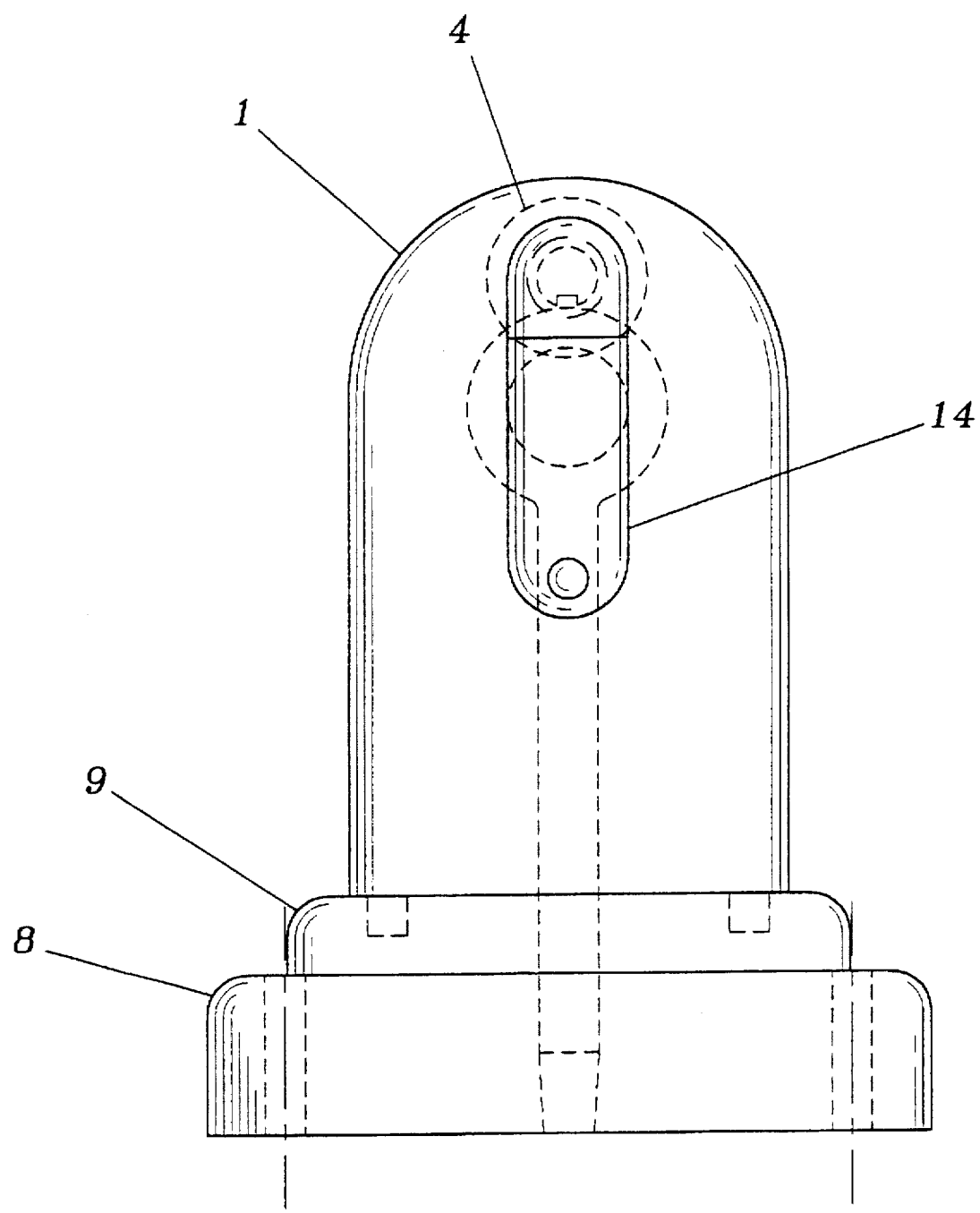
FIG. 4 shows the other end view of the entire invention, with the turntable and upright crank shaft and spool holder and crankshaft in the foreground, mounted on the turret plate, in 1/1 scale. The friction cone is indicated as being situated on the back side of the crankshaft.

LIST OF REFERENCED NUMERALS 1 upright crank shaft and spool holder
2 slide cone
3 spool shaft
4 friction cone reel retainer
5 keyway (for spool shaft)
6 reel seat rings (2x)
7 reel support
8 base plate
9 turntable
10 line guide
11 storage spool
12 washer
13 screw
14 crankshaft
15 underside turret
16 crankshaft screw.

SUMMARY

This fishing reel line winder and unwinder is extraordinarily versatile, usable with various kinds of lines and reels, in all types of fishing applications. It is very portable, sturdy, and contributes to economic savings in spool purchase, line rewinding; and, most importantly, enhances the angler's abilities by greatly facilitating the use of choice of line, properly wound, in almost all fishing applications.

DESCRIPTION OF INVENTION

This is a reel winding and unwinding apparatus, shown in FIGS. 1–6, respectively, from a full side, top, bottom and ends view.

Figure 6:
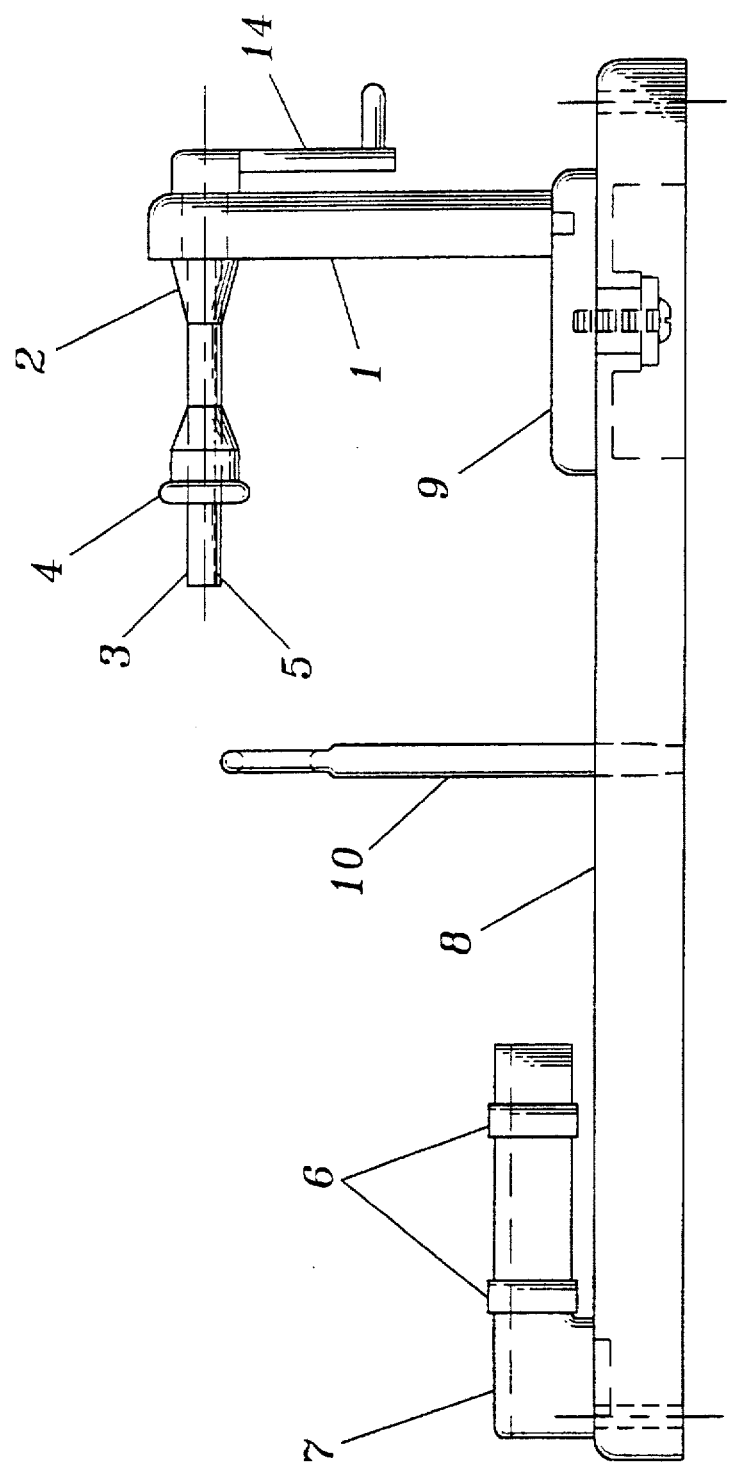
FIG. 6 shows a side view of the entire apparatus, at ½ scale thereof, showing the reel support and the spool shaft as parallel to each other.
Figure 6A:
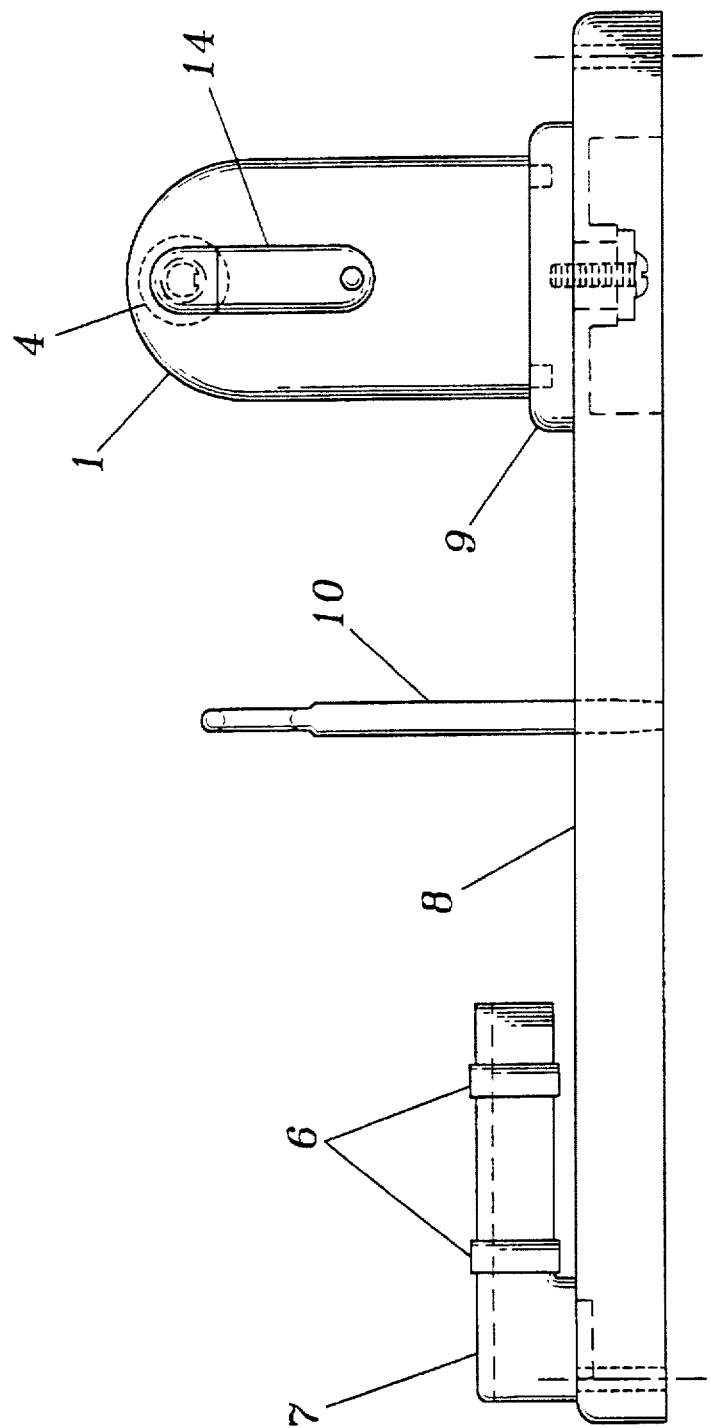
FIG. 6A shows a side view of the entire apparatus, at ½ scale thereof, showing the upright crank shark and spool holder as vertical to the reel support.
Figure 7:
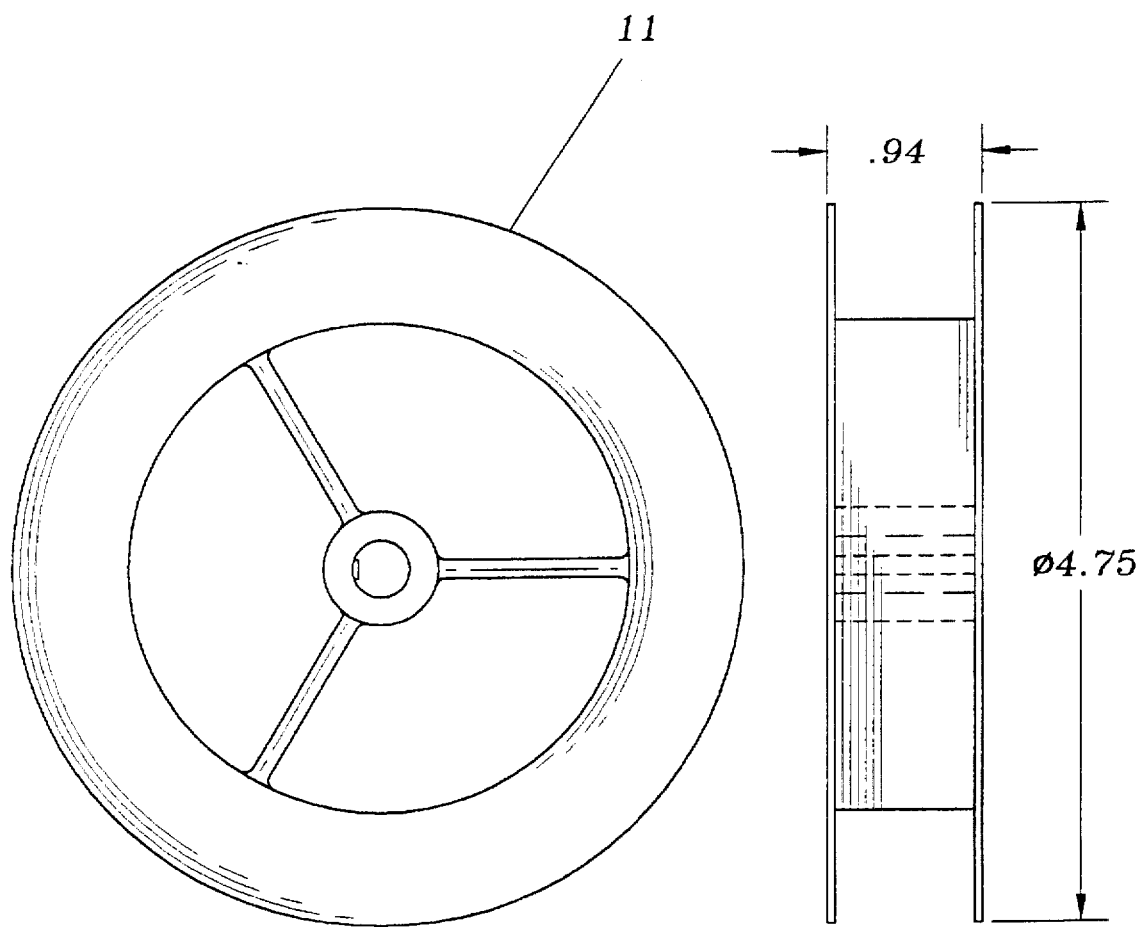
FIG. 7 shows an elevational side view and end view, in 1/1 scale, of a storage spool.
Figure 8:
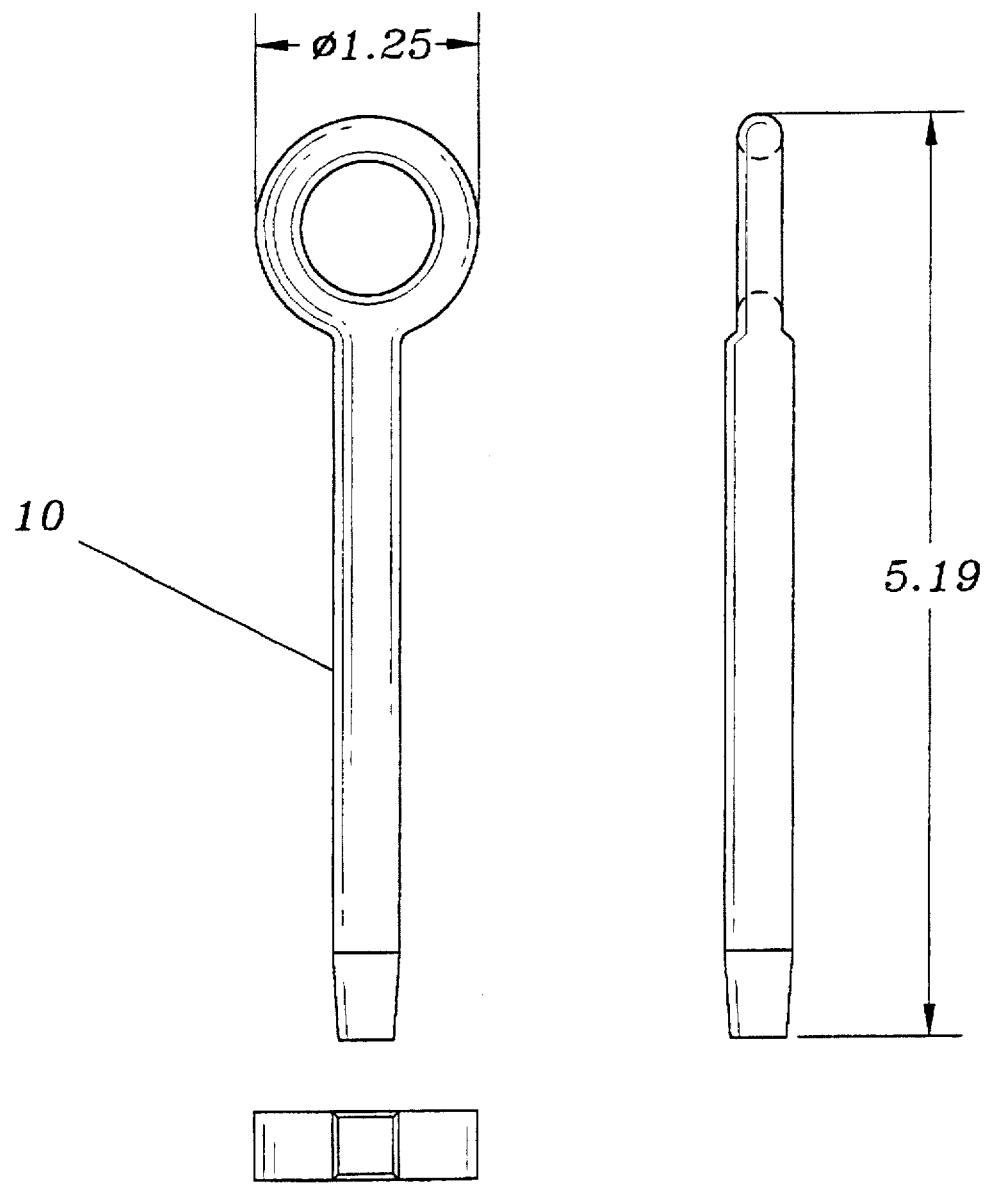
FIG. 8 shows a fragmentary front view and side view of the detachable line guide (used only with a spinning line), in 1/1 scale.
Figure 9:
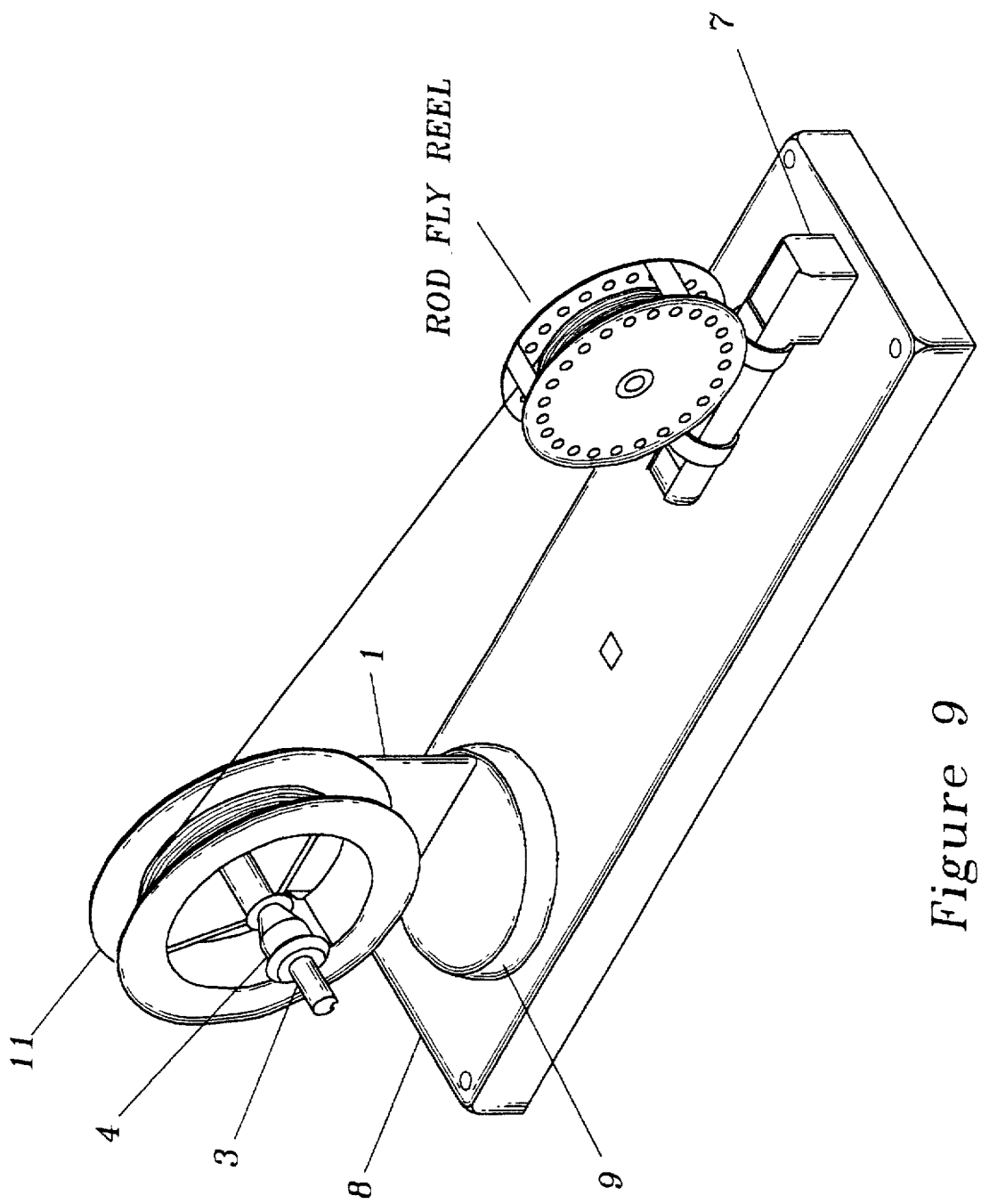
FIG. 9 shows an elevational side view of the entire apparatus, showing the actual mounting of a spool on the spool shaft and a rod fly reel on the reel support, the spool and reel being parallel to each other and the spool shaft and reel support being perpendicular to each other.
Figure 10:
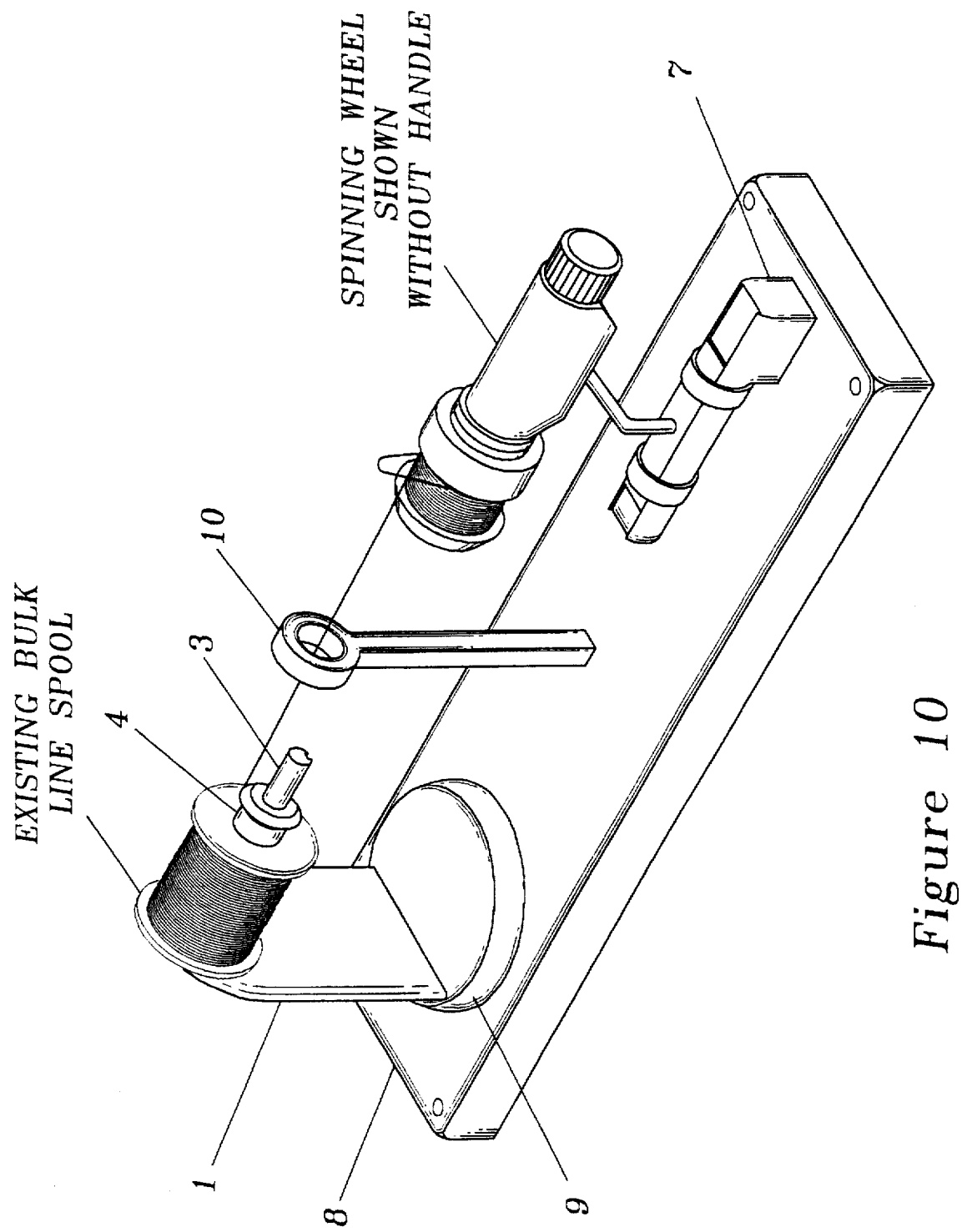
FIG. 10 shows an elevational side view of the entire apparatus, showing the actual mounting of a spool on the spool shaft and a spinning wheel shown without a handle mounted on the reel support, the spool and spinning wheel being parallel to each other and the spool shaft and reel support being perpendicular to each other.

The side views in FIGS. 1 and 6, in ½ scale, give an accurate picture of the total apparatus and its two main working components: a cylindrical reel support 7; a cylindrical shaft 3, a crankshaft 14, an upright crank shaft and a spool holder 1, and a turntable 9, each secured onto opposite ends of a base plate 8.

Reel support 7 consists of a horizontal shaft on an end foot secured to one end of a base plate 8. Two sliding reel seat rings 6 are mounted on the reel support 7. Sliding reel seat rings 6 are made of sturdy plastic intended for strenuous and foolproof operation; reel support 7 is of a single piece of shaped plastic chosen for its strength and durability. This unit is permanently attached to one end of base plate 8, as shown in FIGS. 1 and 6.

Figure 5:
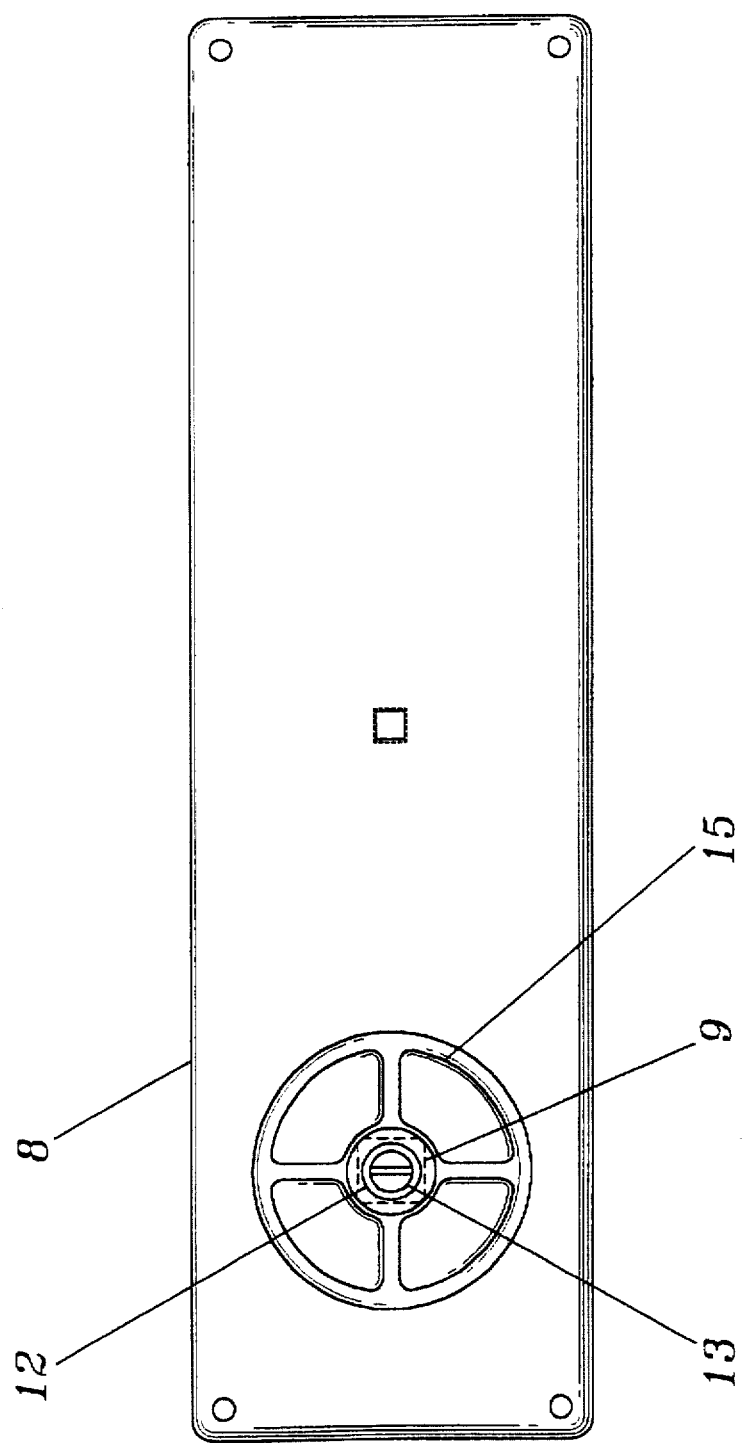
FIG. 5 is the bottom plan view of the entire invention, showing the underside turret with the attendant screw and washer, against the turret plate, in ½ scale.

Turntable 9 unit supports upright crank shaft and spool holder 1, to which a horizontal spool shaft 3 is attached; spool shaft 3 has mounted on it a slide cone 2 and a friction cone reel retainer 4. Spool shaft 3 aligns in parallel with reel support 7 at opposite end of base plate 8, at different heights. A storage spool 11 is inserted onto spool shaft 3 as needed; a keyway (for spool shaft) 5 cut into and along spool shaft 3 allows friction cone reel retainer 4 to move forward and backward on spool shaft 3 and lock in storage spool 11 onto spool shaft 3. Crankshaft 14 emerges from the opposite side of upright crank shaft and spool holder 1, and is attached to spool shaft 3. Turntable 9 is attached to base plate 8 by a screw 13, washer 12 (FIG. 1 Section A—A), and underside turret 15 (FIG. 5). Slide cone 2, spool shaft 3, friction cone and reel retainer 4 and the other parts are of strong, flexible and durable plastic. A line guide 10 is inserted when needed into a prepared bore located in from of upright crank shaft and spool holder 1, and beneath and parallel to spool shaft 3. Line guide 10 is of strong plastic or nylon.

Turntable unit 9 and reel support unit 7 are attached to opposite sides of base plate 8. Turntable 9 unit is revolvable on screw 13, washer 12 and underside turret 15; reel support 7 unit is stationarily affixed to turret plate 8 by a dowelled foot fitted into a base plate 8 cavity.

OPERATION OF INVENTION

The operation of the winder/unwider is as follows:

To operate the unit with storage spool and fly or spinning reel: the apparatus consists of two main units: reel support 7; and turntable 9 unit which winds and unwind from and onto storage spool 11, both supported on base plate 8. The fly reel is placed on reel support 7 and the reel is locked in with reel seat tings 6. Line is taken from the locked fly reel, wrapped around storage spool 11 mounted on spool shaft 3. Storage spool 11 is secured onto spool shaft 3 by slide cone 2. Line is wound upon storage spool 11 by turning crankshaft 14; friction cone reel retainer 4 allows user to adjust the tension of the spool and use bulk spools of different widths. Conversely, when reversing the process and rewinding onto the fly reel attached to reel support 7, friction cone reel retainer 4 can be used to adjust the tension of the line being wound onto the fly reel.

Any diameter or width of storage spool (other than type 11 ) may be inserted onto spool shaft 3, giving the apparatus user great flexibility and savings: any quantity of storage spools may be used and any weight of line may be wound or unwound onto any variety of storage spools, all using this single apparatus. Turntable 9 is revolvable in 90-degree increments by loosening screw 13, slightly lifting turntable 9 out of its position and turning it to the desired position on underside turret 15. This allows user to align spool shaft 3 directly in line with reel support 7, adaptable strictly for the fly angler using nothing but the fly reel, or the spinning angler using nothing but the spinning reel; or the angler using both spinning reel and fly reel. Similarly, the winders works with conventional casting reels.

Keyway (for spool shaft) 5 allows user to lock storage spool 11 and prevent it from slipping when crankshaft 14 is turned. This also allows user to control line tension when winding line onto storage spool 11 or loosening line from storage spool 11. User can hold the line with one hand, reel with the other hand, and put whatever tension user wants on the line going onto the fly reel or conventional reel.

Turntable 9 unit is unique because it can be used by left-handed or right-handed angler simply by rotating turntable 9 position.

To operate the unit with spinning reel: to remove the old line from a spinning reel, user places spinning reel onto reel support 7 and locks the reel in with reel seat tings 6. Mono-filament line is attached to storage spool 11 secured upon spool shaft 3 and held down by slide cone 2 and friction cone reel retainer 4. Crankshaft 14 is turned to crank the line directly off the spinning reel. Tension can be controlled by user by holding the line with one hand and cranking with the other. This operation is to remove old line from the spinning reel in order to discard it.

The operation of putting spinning line onto spinning reel is the reverse of removing old line: turntable 9 screw 13 is removed and turntable 9 is positioned so bulk spool is 90 degree to reel seat and the spool shaft 3 is directly facing the spinning reel. In this way the new bulk spinning line storage spool 11 can be slipped onto spool shaft 3, locked with keyway 5, threaded to the spinning reel attached to reel support 7. In this way, the line can be taken off the bulk storage spool 11, collected on the spinning reel by operating the spinning reel by turning the crank on the spinning reel and line hand held coming off bulk spool; the line is wound straight on the reel from the bulk spool.

Line guide 10 is inserted into base 8 and used with the spinning reel to guide the line winding from bulk spool to spinning reel.

Conclusion, Ramifications, and Scope of Invention

Thus the reader will easily see that this winder/rewinder provides complete line-winding service to all anglers by being very flexible, highly reliable, light-weight yet sturdy, economical and incredibly easy to use by either the right- or left-handed angler.

While the above description contains many specificities, these should not be construed as limitations on the scope of the invention, but rather an exemplification of one preferred embodiment thereof. Many other variations are possible. For example, the base may be of many kinds of wood, light-weight aluminum, or heavy-duty plastic; the plastic construction can contain certain light-weight metals. Accordingly, the scope of the invention should be determined not by embodiment(s) illustrated, but by the appended claims and their legal equivalents.

I claim:

1. A device for winding and unwinding line, the device comprising:

A base plate having a top surface and an undersurface, said base plate mounting above said top surface a reel support and a spool winding means for winding and unwinding line, said reel support mounted in operative relation for transferring line to and from said spool winding means, said spool winding means being coupled to a turntable, said turntable for allowing said spool winding means to rotate upon said baseplate in degree increments for right or left handed winding and unwinding.

2. The device as recited in claim 1, wherein said spool winding means further comprises an upright holder, said holder being elongate and rotatably mounting a spool shaft and a crank shaft at a first uppermost end, said holder coupled to said turntable at a second lowermost end, said spool shaft protruding perpendicularly outward from said holder along a first side of said holder, said crank shaft operatively coupled to said spool shaft and protruding from a second opposite side of said holder.

3. The device as recited in claim 2, wherein said spool shaft further comprises a slide cone, a friction cone and a keyway, said slide cone mounted upon said spool shaft in opposing relation to said friction cone, said keyway being cut axially into said spool shaft for locking a storage spool from which line is wound and unwound, said storage spool for positioning between said slide cone and said friction cone.

4. The device as recited in claim 3, wherein said slide cone is fixedly mounted upon said spool shaft, said friction cone having a through-bore for slidably mounting upon said spool shaft, said through-bore further comprising a notch therein for engaging with said keyway, thereby preventing said friction cone from rotating upon said spool shaft.

5. The device as recited in claim 4, further comprising a line guide removably mounted between said reel support and said spool winding means, said line guide removably mounted in a cavity disposed in said base plate, said line guide further comprising a bore for transferring line through.

6. The device as recited in claim 1, further comprising reel seat rings upon said reel support for mounting both fly and spin reels.

7. A device for winding and unwinding line, the device comprising:

A base plate having opposing ends, wherein a reel support is coupled to a first opposing end and a spool winding means for winding and unwinding line is coupled to a second opposing end, both said reel support and said spool winding means protruding upward from a top surface of said base plate, said reel support and said spool winding means at different heights above said top surface of said base plate, said reel support and said spool winding means facing each other in operative relation for winding and unwinding line, said spool winding means being coupled to a turntable, said turntable for allowing said spool winding means to rotate upon said baseplate in degree increments for right or left handed winding and unwinding.

8. The device as recited in claim 7, wherein said spool winding means further comprises an upright holder, said holder being elongate and rotatably mounting a spool shaft and a crank shaft at a first uppermost end, said holder coupled to said turntable at a second lowermost end, said spool shaft protruding perpendicularly outward from said holder along a first side of said holder, said crank shaft operatively coupled to said spool shaft and protruding from a second opposite side of said holder.

9. The device as recited in claim 8, wherein said spool shaft further comprises a slide cone, a friction cone and a keyway, said slide cone mounted upon said spool shaft in opposing relation to said friction cone, said keyway being cut axially into said spool shaft for locking a storage spool from which line is wound and unwound, said storage spool being positioned between said slide cone and said friction cone.

10. The device as recited in claim 9, wherein said slide cone is fixedly mounted upon said spool shaft, said friction cone having a through-bore for slidably mounting upon said spool shaft, said through-bore further comprising a notch therein for engaging with said keyway thereby preventing said friction cone from rotating upon said spool shaft.

11. The device as recited in claim 10, further comprising a line guide removably mounted between said reel support and said spool winding means, said line guide removably mounted in a cavity disposed in said base plate, said line guide further comprising a bore for transferring line through.

12. The device as recited in claim 11, further comprising reel seat rings upon said reel support for mounting both fly and spin reels.

* * * * *